United States Patent
Del Carpio Vega et al.

(10) Patent No.: US 10,299,282 B2
(45) Date of Patent: May 21, 2019

(54) ACCESS POINT, WIRELESS DEVICE AND METHODS FOR OBTAINING INFORMATION ABOUT TRANSMISSION PATTERNS OF INTERFERING RADIO SYSTEMS

(71) Applicant: Telefonaktiebolaget LM Ericsson (publ), Stockholm (SE)

(72) Inventors: Luis Felipe Del Carpio Vega, Espoo (FI); Behnam Badihi, Kirkkonummi (FI); Dennis Sundman, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/580,929

(22) PCT Filed: Jun. 10, 2015

(86) PCT No.: PCT/SE2015/050674
§ 371 (c)(1),
(2) Date: Dec. 8, 2017

(87) PCT Pub. No.: WO2016/200303
PCT Pub. Date: Dec. 15, 2016

(65) Prior Publication Data
US 2018/0167949 A1    Jun. 14, 2018

(51) Int. Cl.
*H04W 72/04* (2009.01)
*H04W 72/08* (2009.01)
(Continued)

(52) U.S. Cl.
CPC ..... *H04W 72/082* (2013.01); *H04W 72/0446* (2013.01); *H04W 74/0808* (2013.01);
(Continued)

(58) Field of Classification Search
None
See application file for complete search history.

(56) References Cited

U.S. PATENT DOCUMENTS

2005/0122231 A1*  6/2005  Varaiya ............. H04W 40/22
                                             340/870.01
2007/0002890 A1   1/2007  Mangold et al.
(Continued)

OTHER PUBLICATIONS

Sheu S.-T. et al., "PLFC:The Packet Length Fuzzy Controller to Improve the Performance of WLAN under the Interference of Microwave Oven", In: Global Telecommunications Conference, 2000. GLOBECOM '00. IEEE, vol. 3, pp. 1427-1431 (Year: 2000).*
(Continued)

*Primary Examiner* — Joseph A Bednash
(74) *Attorney, Agent, or Firm* — Murphy, Bilak & Homiller, PLLC

(57) ABSTRACT

An AP, a wireless device as well as a method performed by the AP and a method performed by the wireless device for communication between the AP and the wireless device are provided. The AP and wireless device are operable in a WLAN employing contention based access for radio resources. The method performed by the AP comprises obtaining (110) information about transmission pattern(s) of interfering radio system(s), and determining (130) a deviation of packet length for transmission(s) of the interfering radio systems(s). The method further comprises indicating (140), to the wireless device the deviation of packet length and the information about transmission pattern(s) of interfering radio system(s) when the deviation is less than a deviation threshold.

20 Claims, 9 Drawing Sheets

(51) Int. Cl.
*H04W 72/12* (2009.01)
*H04W 74/08* (2009.01)
*H04W 84/12* (2009.01)
*H04W 88/10* (2009.01)

(52) U.S. Cl.
CPC ........ *H04W 72/1215* (2013.01); *H04W 84/12* (2013.01); *H04W 88/10* (2013.01)

(56) References Cited

U.S. PATENT DOCUMENTS

| | | | |
|---|---|---|---|
| 2012/0281566 A1* | 11/2012 | Pelletier | H04W 76/27 370/252 |
| 2013/0017794 A1 | 1/2013 | Kloper et al. | |

OTHER PUBLICATIONS

Flore, Dino, "3GPP & unlicensed spectrum", IEEE 802 Interim Session, Atlanta, USA, Jan. 11-16, 2015, 1-17.

Sheu, Shiann-Tsong et al., "PLFC: The Packet Length Fuzzy Controller to Improve the Performance of WLAN under the Interference of Microwave Oven", IEEE Global Telecommunications Conference GLOBECOM '00, Nov. 27-Dec. 1, 2000, 1427-1431.

Unknown, Author, "Part 11: Wireless LAN Medium Access Control (MAC) and Physical Layer (PHY) Specifications", IEEE P802.11ah™/D4.0 Draft Standard for Information technology—Telecommunications and information exchange between systems Local and metropolitan area networks—Specific requirements, Jan. 2015, 1-626.

Unknown, Author, "Part 11: Wireless LAN Medium Access Control (MAC) and Physical Layer (PHY) Specifications", IEEE Std 802.11-2012 (Revision of IEEE Std 802.11-2007), IEEE Computer Society, IEEE Standard for Information technology—Telecommunications and information exchange between systems, Local and metropolitan area networks—Specific requirements, New York, USA, Mar. 29, 2012, pp. 1-2793.

Unknown, Author, "Qualcomm Research LTE in Unlicensed Spectrum: Harmonious Coexistence with Wi-Fi", Qualcomm Technologies, Inc., 2014, 1-19.

Zhen, Bin et al., "Clear Channel Assessment in IntegratedMedical Environments", Hindawi Publishing Corporation, EURASIP Journal on Wireless Communications and Networking, vol. 2008, Article ID 821756, Jul. 16, 2007, 1-8.

* cited by examiner

ACCESS POINT, WIRELESS DEVICE AND METHODS FOR OBTAINING INFORMATION ABOUT TRANSMISSION PATTERNS OF INTERFERING RADIO SYSTEMS

TECHNICAL FIELD

The present disclosure relates to wireless communication and in particular to communication between a wireless device and an access point, AP, in a Wireless Local Area Network, WLAN, the WLAN employing contention based access for radio resources.

BACKGROUND

WLAN systems based on Institute of Electrical and Electronics Engineers, IEEE 802.11 standard utilises Industry, Scientific and Medical, ISM, radio bands. The medium access control of IEEE 802.11 is Carrier Sense Multiple Access with Collision Avoidance (CSMA/CA). The basic idea in CSMA/CA is that a wireless device (also referred to as STA) first senses the channel and if it is idle accesses it for transmission.

WLANs may use one of two modes; ad hoc mode or infrastructure mode. In ad hoc mode, a wireless device communicates with only one or a few other devices directly while in infrastructure mode, each device directly communicates with an Access Point, AP, to reach each another, or connect to the Internet. In this disclosure it is assumed that the infrastructure mode is used in a sensor monitoring scenario, where the data is delay tolerant. By delay tolerant is meant data that does not lose value if the delivery is delayed in the communication network. Also, it is assumed that a sensor WLAN STA, i.e. a wireless device in a WLAN acting as a sensor, is willing to save power when possible.

In the decentralised IEEE 802.11 MAC access principle based on CSMA/CA and implemented via the Distributed Coordination Function, DCF, or the Enhanced Distributed Channel Access, EDCA, different timing intervals are specified. The timing intervals of interest in this disclosure are for example: slot time, short inter-frame space, SIFS, distributed inter-frame space, DIFS, arbitration inter frame space, AIFS, and extended inter-frame space, EIFS.

When a wireless device wants to transmit, the medium is checked for occupancy; this procedure is called Clear Channel Assessment, CCA. If the medium is idle for a predefined period (e.g. DIFS or EIFS) plus a back-off time defined as a random number of slots chosen from a Contention Window, CW, the transmission will start as establish in 802.11 systems. If the medium is considered busy, the wireless device will defer its transmission until the medium is idle. The size of the CW is doubled with each unsuccessful transmission.

The CCA operates through two main methods, signal detection CCA, and energy detection CCA.

The signal detect CCA consists of a physical signal detect and a virtual signal detect. The physical signal detect is carried out directly on the PHY layer and is a direct measurement of the received signal strength of a valid 802.11 transmission through preamble detection. The virtual signal detect is provided by the Media Access Control, MAC, layer and uses the Network Allocation Vector, NAV, functionality. In essence, the NAV is a virtual carrier-sensing mechanism that contains a timer, which defers the wireless device from accessing the medium a certain time. The value of the timer is decided by reading the duration length of a preceding packet and adding additional IFS time e.g. DIFS. By using the NAV, the wireless device does not need to constantly monitor the environment for example it may sleep during NAV and may thus save energy. In 802.11ah, there is also a secondary virtual carrier sensing mechanism called Response Indication Deferral, RID, with a similar functionality as the NAV. Both the NAV and the RID counters must have reached zero before the wireless device can access the medium.

Energy detect CCA integrates the signal strength from the radio frontend during the CCA window. Thus, no knowledge of the type of data is required. This energy level is then compared to the noise floor (derived from the background noise) to make a decision whether the medium is occupied or not. The main advantages of energy detect CCA, compared to signal detect CCA are: low complexity, generality, and low power consumption. It has low complexity since no decoding of the signal is required, it is general because no information about the received signal is necessary, and it does not require much power since no receiver complexity besides an energy detector is required. The CCA module can be a simple non-coherent module. Unlike the signal detect CCA; there is no need to wait for synchronisation and detection of the underlying signal. However, the energy detect CCA also suffers one significant drawback compared to the signal detect CCA; in order of accurately detect the presence of an interferer, the energy detect CCA requires a signal strength that is in the order of 20 dB stronger compared to the signal detect CCA.

The 802.11ah amendment introduced a new sensor wireless device, also referred to as a sensor STA, using data frames with small payload size and expected low duty cycle, and low traffic volumes. These sensor wireless devices are typically deployed in static locations. Furthermore, the sensor wireless devices may be deployed in big numbers in locations that are difficult to access; thus a long battery life (up to several years) is essential. Therefore, power efficiency and low complexity are key features in these wireless devices. The sort of measurement performed by the sensor wireless devices is typically known, and it makes sense that the data transmitted by sensor wireless devices is predictable (and often also small); furthermore it may often fit into one single transmission packet.

A Basic Service Set, BSS, is usually maintained by a single AP; it can suffer interference from other WLAN systems or interference from other radio systems which are not WLAN, operating the same frequency band. Examples of such systems may be Bluetooth, 802.15.4, or Long Term Evolution License Assisted Access, LTE LAA.

LTE LAA is a feature which allows LTE to take advantage of unlicensed spectrum which is normally used for example by WLAN systems. In general the principle is to allow a fair coexistence between LTE LAA and WLAN from the point of view of air-time.

A WLAN wireless device may potentially decode other WLAN transmissions not intended to itself, and thus, a WLAN can use signal detect CCA, decode the packet and set its NAV/RID timer to defer from access the channel. However, a WLAN wireless device cannot decode a non-WLAN technology and thus it keeps accessing the channel using energy detection until it is free in order to start transmission which consumes unnecessary power.

Since the medium (i.e. radio resources of one or more channels) is shared among many wireless devices, access to the communication medium follows the aforementioned CSMA/CA methodology. If there may be non-WLAN systems present in the same frequency band, they will cause considerable interference. Then, sensor wireless devices will waste power accessing the channel busy/idle because wireless devices keep accessing the channel using energy detection until it is free in order to start transmission s. Since long battery life is an essential feature in the sensor type wireless devices, this power waste due to channel sensing is undesirable.

SUMMARY

The object is to obviate at least some of the problems outlined above. In particular, it is an object to provide an AP and a wireless device and respective method performed thereby for communicating there between. These objects and others may be obtained by providing an AP and a wireless device and a method performed by an AP and a wireless device according to the independent claims attached below.

According to an aspect a method performed by an AP operable in a WLAN for communicating with a wireless device, the WLAN employing contention based access for radio resources is provided. The method comprises obtaining information about transmission pattern(s) of interfering radio system(s), and determining a deviation of packet length for transmission(s) of the interfering radio systems(s). The method further comprises indicating, to the wireless device, the deviation of packet length and the information about transmission pattern(s) of interfering radio system(s) when the deviation is less than a deviation threshold.

According to an aspect, a method performed by a wireless device operable in a WLAN for communicating with an AP is provided. The method comprises receiving, from the AP, information indicating a deviation of packet length and information about transmission pattern(s) of interfering radio system(s); and using the received information for communication with the AP.

According to an aspect, an AP operable in a WLAN for communicating with a wireless device, the WLAN employing contention based access for radio resources is provided. The AP is configured for obtaining information about transmission pattern(s) of interfering radio system(s), and determining a deviation of packet length for transmission(s) of the interfering radio systems(s). The method further comprises indicating, to the wireless device the deviation of packet length and the information about transmission pattern(s) of interfering radio system(s) when the deviation is less than a deviation threshold.

According to an aspect, a wireless device operable in a WLAN for communicating with an AP is provided. The wireless device is configured for receiving, from the AP, information indicating a deviation of packet length and information about transmission pattern(s) of interfering radio system(s); and using the received information for communication with the AP.

The AP, the wireless device and the method performed by the AP and by the wireless device may have several advantages. One possible advantage is that when signal detection is not possible at the wireless device, but energy detection detects traffic on the channel, the wireless device may set the Virtual Carrier-Sensing time information to a known time, or fixed time. By transmitting the above described information to the wireless device, the wireless device is informed if it is allowed to set the virtual carrier-sensing information and may determine how long to set it based on the transmitted information. The wireless device may also sleep during the virtual carrier-sensing time. Utilising this knowledge, during non-decodable interference, by performing virtual carrier-sensing instead of constantly monitoring the channel the wireless device will save battery.

BRIEF DESCRIPTION OF DRAWINGS

Embodiments will now be described in more detail in relation to the accompanying drawings, in which.

DETAILED DESCRIPTION

Briefly described, an AP, a wireless device as well as a method performed by the AP and a method performed by the wireless device for communication between the AP and the wireless device are provided. When the wireless device senses the channel (radio resources) in order to determine if the channel is busy or free, and the wireless device detects transmission(s) which it cannot decode, the wireless device may switch to sleep mode for a period in time. In this manner, in the presence of non-WLAN interference or WLAN interference originating from another WLAN that the WLAN in which the wireless device is operating, the wireless device may save energy by activating the virtual carrier-sensing mechanism during a time period instead of continuously monitoring the channel and even switching to sleep mode during virtual-carrier sensing.

When signal detection is not possible or successful, but energy detection detects traffic on the channel, the wireless device may set the virtual carrier-sensing mechanism information for a period of time and even switch to sleep mode during virtual carrier-sensing. During non-decodable interference, by using virtual carrier-sensing instead of constantly monitoring the channel, the wireless devices may save battery.

Figure 1:
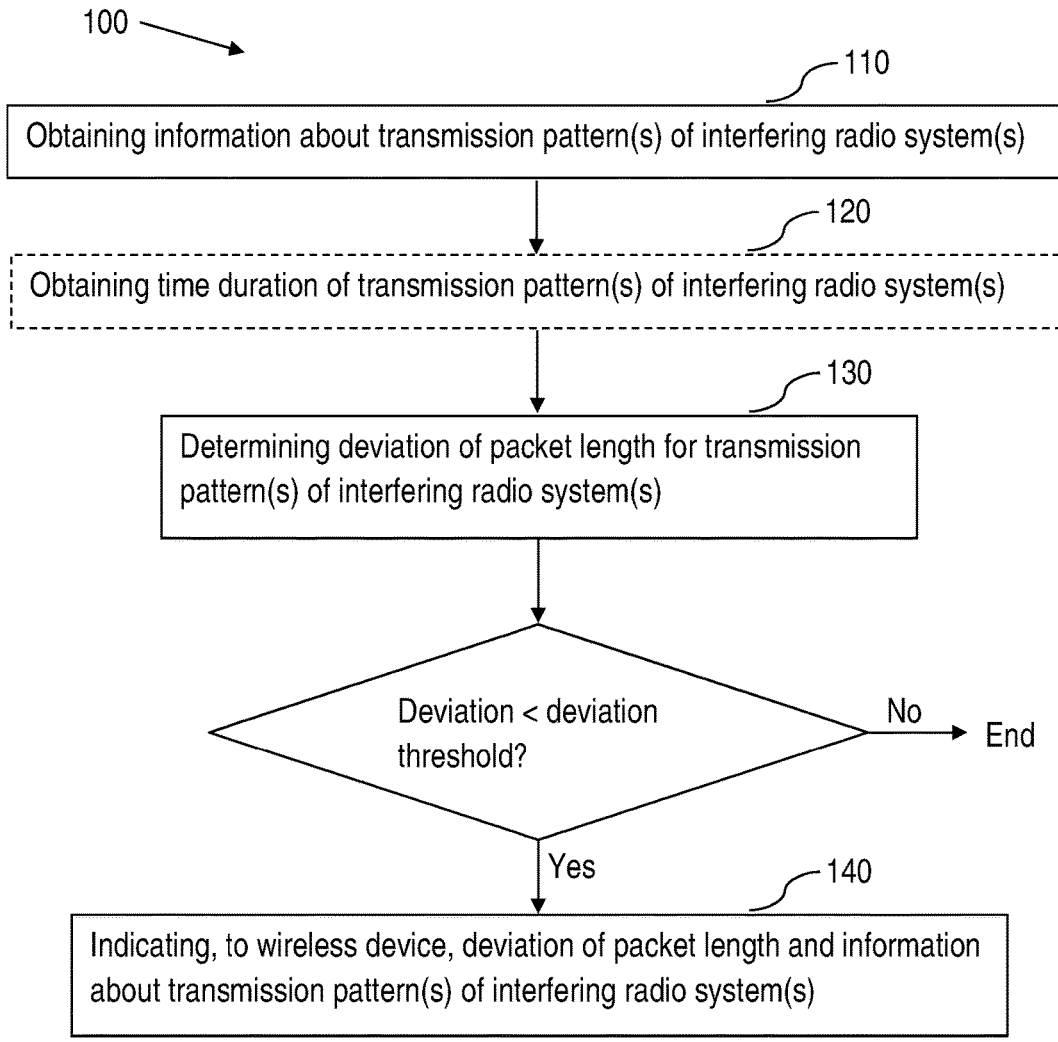
FIG. 1 is a flowchart of a method performed by an AP for communicating with a wireless device according to an exemplifying embodiment.

Embodiments herein relate to a method performed by an Access Point, AP, operable in a Wireless Local Area Network, WLAN, for communicating with a wireless device, the WLAN employing contention based access for radio resources are provided. Different embodiments of such a method will now be described with reference to FIG. 1. FIG. 1 illustrates the method comprising obtaining 110 information about transmission pattern(s) of interfering radio system(s), and determining 130 a deviation of packet length for transmission(s) of the interfering radio systems(s). The method further comprises indicating 140, to the wireless device the deviation of packet length and the information about transmission pattern(s) of interfering radio system(s) when the deviation is less than a deviation threshold.

There may be more than one interfering radio system and the interfering radio system(s) may be associated with individual transmission patterns. A transmission pattern may for example comprise lengths in time of bursts of traffic/transmissions, time interval between bursts of traffic/transmissions, and/or length of packets comprised in the transmissions. There may be different ways of obtaining the information about transmission pattern(s) of interfering radio system(s) as will be described in more detail below. The information provides the AP with knowledge of when in time, and how long in time, it is likely to be interfering transmissions/traffic originating from other radio system(s).

Traffic/transmissions originating from interfering radio system(s) may employ the same or different Radio Access Technology, RAT, but the wireless device will not be able to decode it the traffic/transmissions. However, the wireless device will be able to detect the traffic/transmissions by energy detection, wherein the wireless device will refrain from transmitting, and generally the wireless device will wait for a period of time before trying to access the channel, or radio resources, again.

The AP also determines the deviation of packet lengths for the transmissions of the interfering radio system(s). Depending on the deviation of packet length for transmission(s) of the interfering radio systems(s) computed for example as an standard deviation or mean absolute deviation or median absolute deviation or some other deviation value, the wireless device may take different actions as will also be described in more detail below. Consequently, the AP may e.g. compare the deviation of packet length for transmission(s) of the interfering radio systems(s) computed for example as a standard deviation or mean absolute deviation or median absolute deviation or some other deviation value to a deviation threshold. When the deviation is less than the deviation threshold, the wireless device should, as stated above, take different actions.

In order for the wireless device to know if it should take the different actions, it needs to know that the deviation is less than the deviation threshold. Consequently, the AP indicates, to the wireless device the deviation of packet length.

Still further, the actions that the wireless device may take is also dependent on the transmission pattern(s) of interfering radio system(s); wherein the information about transmission pattern(s) of interfering radio system(s) is also sent to the wireless device by the AP.

The deviation of packet length may be a standard deviation of packet length, or mean absolute deviation of packet length or median absolute deviation of packet length.

The method performed by the AP may have several advantages. One possible advantage is that when signal detection is not possible at the wireless device, but energy detection detects traffic on the channel, the wireless device is allowed to activate the virtual carrier-sensing information for a known time, or fixed time. By transmitting the above described information to the wireless device, the wireless device is informed if it is allowed activate virtual carrier-sensing information and may determine how long to activate virtual carrier-sensing information based on the transmitted information. Utilising this knowledge, during non-decodable interference, by setting virtual carrier-sensing information instead of constantly monitoring the channel and even switching to sleep mode during virtual-carrier sensing the wireless device will save battery.

The method may further comprise obtaining 120 information about time duration of transmission(s) of the interfering radio systems(s), and indicating the time duration of transmission(s) of the interfering radio systems(s) when indicating 140, to the wireless device the deviation of packet length and the information about transmission pattern(s) of interfering radio system(s).

Time duration of transmission(s) of interfering radio system(s) may be an average "time on air", i.e. an average time duration of transmitted packets. As expressed above, it can also be seen as the time duration of a burst of traffic/transmission originating from the interfering radio system(s).

Since the wireless device may be allowed to activate virtual carrier-sensing and possibly to switch to a sleep mode, the length of which is dependent on the time duration of transmission(s) of interfering radio system(s), the AP indicates the time duration of transmission(s) of the interfering radio systems(s) to the wireless device. This indication of the time duration of transmission(s) of the interfering radio systems(s) may be comprised in the indication of the deviation of packet length and the information about transmission pattern(s) of interfering radio system(s).

Obtaining 120 the information about time duration of transmission(s) is illustrated in FIG. 1 with a dotted box. The dotted box illustrates that this action is optional, wherein the method may not necessarily comprise this step.

In an example, obtaining 120 the information about time duration of transmission(s) comprises (i) estimating it based on the transmission pattern(s) of interfering radio system(s), and/or (ii) receiving information about it from the interfering radio system(s) using inter-system communication.

There are different ways for the AP to obtain the information about time duration of transmission(s). The AP may continuously, regularly or randomly listen for transmissions on the channel(s) between itself and the wireless device. It shall be pointed out that the AP may communicate with a plurality of different wireless devices, but for simplicity one wireless device is described here. As the AP listens for transmissions, it also may detect (or hear) transmissions originating from other, i.e. interfering, radio system(s). The AP may then in a first example, (i), estimate the information about time duration of transmission(s) based on the transmissions that the AP can hear, but possible not decode. In a second example, (ii), AP (or another node/entity in the WLAN) may communicate with the interfering radio system (s), wherein information about transmissions, such as transmission patterns, transmission duration, and occurrences in times thereof may be exchanged.

In yet an example, obtaining 110 of information about transmission pattern(s) comprises receiving information from the interfering radio system(s).

As explained above, the AP, or any other node or entity of the WLAN in which the AP and wireless device are operating may be able to communicate with the interfering radio system(s). In this manner, information may be exchanged between the WLAN and the interfering radio system(s). In an example, the information exchanged comprises information about transmission pattern(s).

In still an example, obtaining 110 of information about transmission pattern(s) comprises performing measurements of interfering transmission(s) from the interfering radio system(s).

By performing measurements, the AP may obtain various types of information. The measurements may be performed actively by the AP or may be performed by the wireless device and then sent to the AP.

The measurements may be related to detected energy of different frequencies, received signal strength of different signals and so on.

Also as described above, the AP may continuously, regularly or randomly listen for transmissions on the channel(s) between itself and the wireless device. As the AP listens for transmissions, it also may detect (or hear) transmissions originating from other, i.e. interfering, radio system(s). The AP may from this information deduce when in time there is statistically few interfering transmissions and when in time there is statistically many interfering transmissions. The AP may also deduce the average length of the interfering transmissions and so on. All this information may be used to determine, i.e. obtain, information about transmission pattern(s) of interfering radio system(s).

The information signalled to the wireless device may further comprise information indicating whether the wireless device may use the information for choosing length of virtual carrier-sensing time and/or choosing length of a sleep mode period.

When the AP has obtained, determined and/or estimated the information comprising the information about transmission pattern(s) of interfering radio system(s), the deviation of packet length for transmission(s) of the interfering radio systems(s) and time duration of transmission(s) of the interfering radio systems(s), the AP may determine if the wireless device is allowed to use the information for choosing length of virtual carrier-sensing time and/or choosing length of a sleep mode period. It may be that the wireless device may need the information for additional, or other, purposes than choosing length of virtual carrier-sensing time and/or choosing length of a sleep mode period.

Consequently, the AP incorporates an indication in the information that is signalled to the wireless device. The indication informs the wireless device whether the wireless device may use the signalled information for choosing length of virtual carrier-sensing time and/or choosing length of a sleep mode period.

Embodiments herein also relate to a method performed by a wireless device in a WLAN for communicating with an AP. The WLAN employs contention based access for radio resources. Embodiments of such a method will now be described with reference to FIGS. 2a-2d.

Figure 2A:
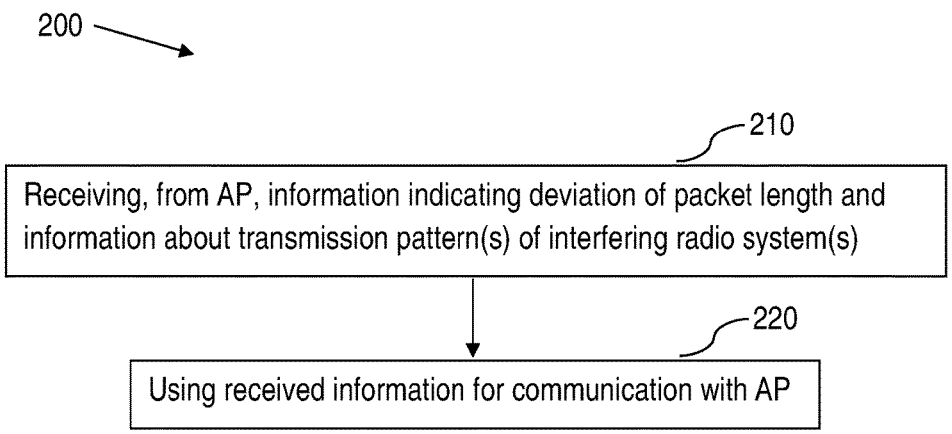
FIG. 2a is a flowchart of a method performed by a wireless device for communicating with an AP according to an exemplifying embodiment.

FIG. 2a illustrates the method comprising receiving 210, from the AP, information indicating a deviation of packet length and information about transmission pattern(s) of interfering radio system(s); and using 220 the received information for communication with the AP.

The AP signals this information to the wireless device as described above. The wireless device thus receives information form the AP, the information indicates the deviation of packet length among other things. The deviation of packet length may be a standard deviation, and it also serves as an indication if it is possible for the wireless device to use the information for e.g. choosing length of virtual carrier-sensing time and/or a sleep mode period, or in a more general term for using the received information for communication with the AP.

The information received from the AP also comprises information about transmission pattern(s) of interfering radio system(s). The wireless device may use this information for communication with the AP. Using the information for communication with the AP has several different aspects and embodiments, which will be explained below. Merely as a non-limiting example, the wireless device may use the information for communication with the AP by going to sleep for a period of time based on the received information, wherein the wireless device may refrain from communicating with the AP.

The method performed by the wireless device may the same have several advantages as the method performed by the AP. One possible advantage is that when signal detection is not possible at the wireless device, but energy detection detects traffic on the channel, the wireless device is allowed to activate the virtual carrier-sensing mechanism and possibly doze for a known time, or fixed time. By receiving the above described information from the AP, the wireless device is informed if it is allowed to activate the virtual carrier-sensing and may determine how long to activate the virtual carrier-sensing based on the transmitted information and possibly switch to sleep mode during virtual carrier-sensing. Utilising this knowledge, during non-decodable interference, by activating virtual carrier-sensing instead of constantly monitoring the channel the wireless device will save battery.

The method may further comprise receiving information indicating an estimated time duration of transmission(s) of interfering radio systems(s), wherein the using 220 of the received information also comprises using the received information about the estimated time duration of transmission(s) of interfering radio systems(s) for communication with the AP.

By also receiving the information indicating an estimated time duration of transmission(s) of interfering radio systems(s), the wireless device is provided with knowledge of how long a detected transmission of an interfering radio system may probably last.

Merely as a non-limiting example, assume the estimated time duration of a detected transmission, which transmission the wireless device may not decode and hence deduce is originating from the interfering radio system, is likely to last for a relatively short time. Then the wireless device may determine a time to wait until trying to access the channel for performing a transmission to the AP. In this manner, the wireless device uses the received information about the estimated time duration of transmission(s) of interfering radio systems(s) for communication with the AP by determining a back-off time, i.e. time to wait, until trying to access the channel for performing a transmission to the AP.

Alternatively, in another non-limiting example, assume the estimated time duration of a detected transmission, which transmission the wireless device may not decode and hence deduce is originating from the interfering radio system, is likely to last for a relatively long time. Then the wireless device may activate virtual carrier-sensing mechanism and possibly switch to a sleep mode during virtual carrier-sensing, the length of the virtual carrier-sensing being based on the estimated time duration of the detected transmission.

Figure 2B:
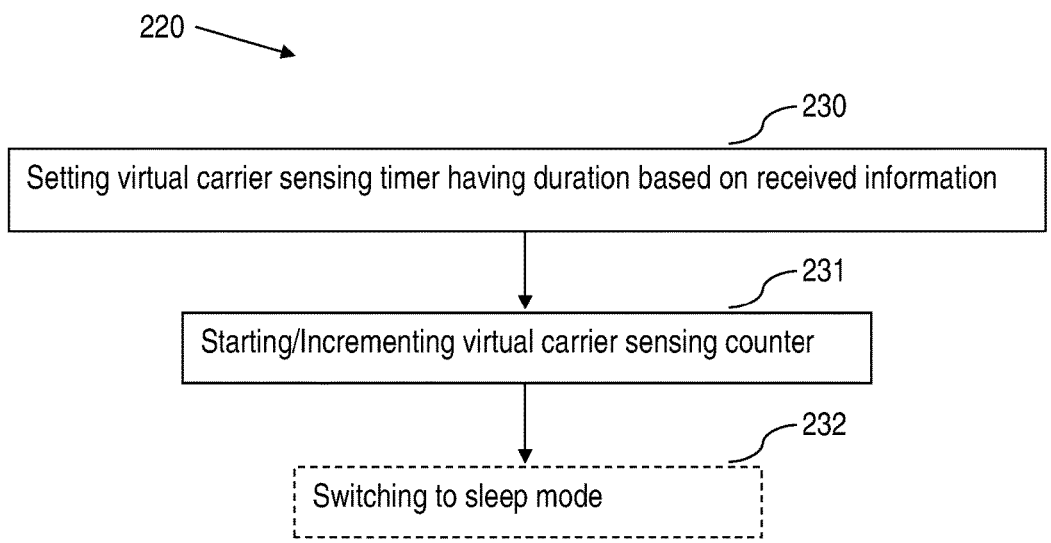
FIG. 2b is a flowchart of a method performed by a wireless device for communicating with an AP according to yet an exemplifying embodiment.

In an example, illustrated in FIG. 2b, the using 220 of the received information comprises, when packet detection fails: setting 230 a virtual carrier sensing timer having a duration which is based on the received information, and starting 231 a virtual carrier sensing occasion counter.

When the wireless device wants to transmit data to the AP, it must first sense the channel to see if the channel (i.e. radio resources) is free. The wireless device may receive transmissions from other wireless devices for example, wherein the wireless device is able to decode a received packet and deduce that the received transmission originated from a node or device within the WLAN. When the detected traffic/transmission originates from within the WLAN, the wireless device decodes the detected traffic/transmission and may set its Network Allocation Vector/Response Indication Deferral, NAV/RID, to perform virtual carrier-sensing. The NAV/RID may comprise a timer, which the wireless device may use for determine how long to wait until trying to access the channel again.

However, the wireless device may not be able to decode traffic that is present on the channel, but it may be able to detect traffic by means of energy detection. If the wireless device in not able to decode traffic that is present on the channel, the wireless device may use the received information, transmitted from the AP, to set the virtual carrier sensing timer, which may be NAV timer or a Response Indication Deferral, RID, timer.

The wireless device may then refrain from accessing the channel during the time of the virtual carrier sensing timer. In other words, the wireless device may start a waiting timer having the length of the virtual carrier sensing timer. The wireless device waits until the timer expires and may then try to access the channel again by sensing the channel.

Further, the wireless device starts the virtual carrier sensing occasion counter, whereby the wireless device may keep track of the number of times the wireless devices tries to access the channel and finds it busy with traffic/transmission originating from outside the WLAN.

The method may further comprise switching 232 to sleep mode after the virtual carrier sensing timer is set.

It may be that the value of the virtual carrier sensing timer is relatively long, wherein there is no use in the wireless device to stay in an active mode. If so, the wireless device may switch to sleep mode, wherein the wireless device will consume less energy. Of course, if the value of the virtual carrier sensing timer is relatively short, the wireless device may stay in the active state waiting for the timer to expire in order to trying to access the channel again.

Figure 2C:
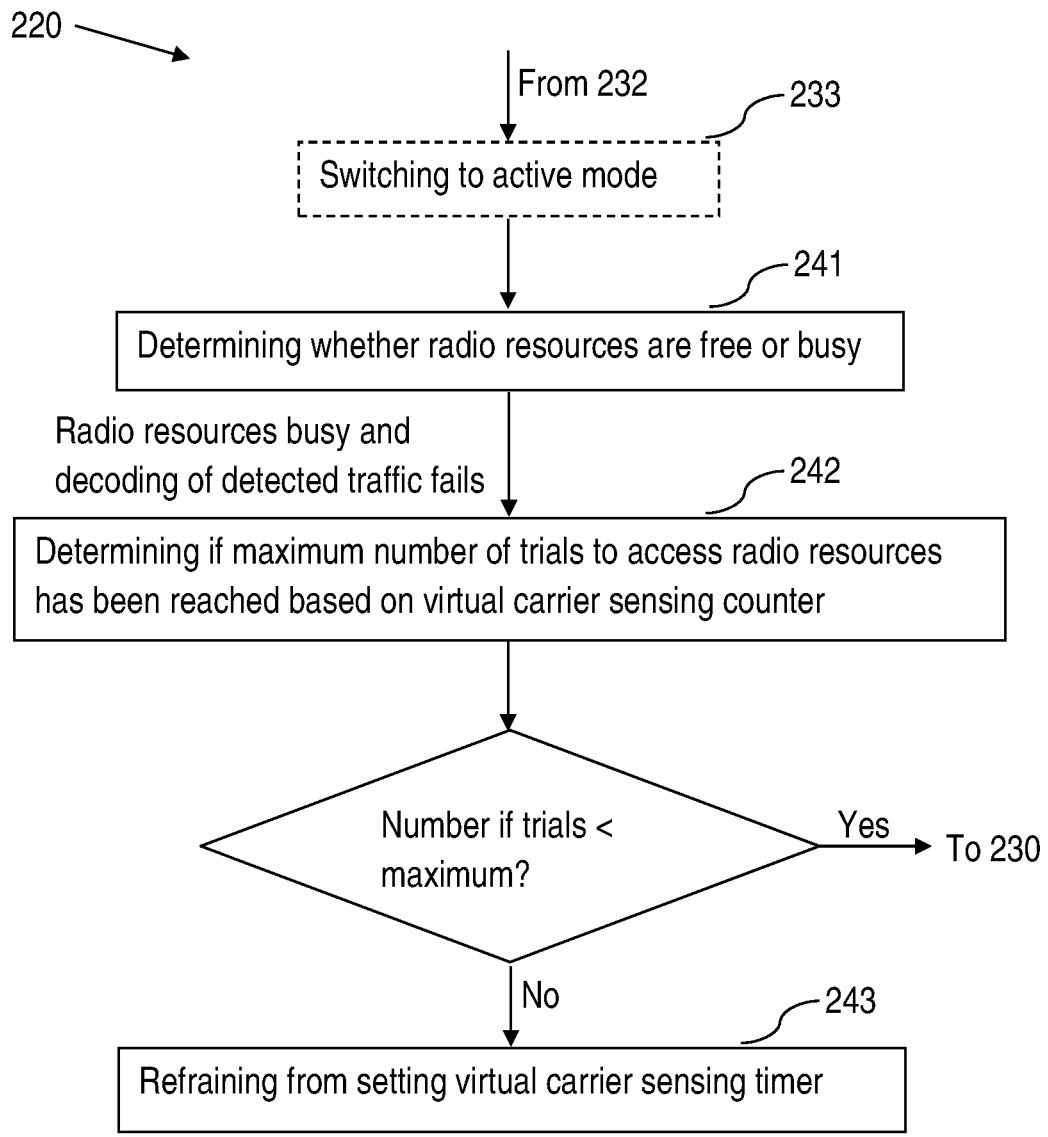
FIG. 2c is a flowchart of a method performed by a wireless device for communicating with an AP according to still an exemplifying embodiment.

In an example illustrated in FIG. 2c, the using 220 of the received information further comprises, when the virtual carrier sensing timer expires: switching 233 to active mode if being in sleep mode; and determining 241 whether the radio resources are free or busy. When the radio resources are busy and when decoding of detected traffic fails, the method comprises determining 242 if the maximum number of trials to access the radio resources has been reached based on the virtual carrier sensing occasion counter, and when the maximum number of trials to access the radio resources has been reached, refraining 243 from setting the virtual carrier sensing timer.

As described above, the action of switching to sleep mode 232 illustrated by a dashed box in FIG. 2b is optional. Consequently, the action of switching 233 to active mode is only necessary if the wireless device is in sleep mode.

If the value, i.e. length, of the virtual carrier sensing timer is long enough to mandate the wireless device switching to sleep mode, the wireless device will do so. If the wireless device has switched to sleep mode, it needs to switch to active mode before taking any other action when the timer expires.

The wireless device tries to access the channel again by determining if the channel is free or busy. It may be that the channel is free or (a) busy with traffic/transmissions originating from within the WLAN or (b) busy with traffic/transmissions originating from outside the WLAN. If the channel is free, the wireless device may transmit data to the AP.

However, if the channel is busy with (a) traffic/transmissions originating from within the WLAN, the wireless device may use the NAV/RID timer to backoff for a time period specified by the NAV/RID timer.

If the channel is busy with (b) traffic/transmissions originating from outside the WLAN, the wireless device determines if the maximum number of trials to access the radio resources has been reached based on the virtual carrier sensing occasion counter. If the virtual carrier sensing occasion counter has not reached its maximum value, being the maximum number of trials to access the radio resources, the wireless device may again set the virtual carrier sensing timer and optionally also go to sleep if the length of the timer mandates switching to sleep mode.

However, if the wireless device has reached the limit of allowed number of trials to access the channel and finding it busy with traffic/transmissions originating outside of the WLAN, the wireless device may not set the timer again.

In an example, the method further comprises, when the maximum number of trials to access the radio resources has not been reached: starting 230 the virtual carrier sensing timer, and incrementing 231 a virtual carrier sensing occasion counter.

Since the wireless device may be allowed to perform several attempts to access the channel and failing due to the radio resources, i.e. the channel, being busy with traffic/transmissions originating outside the WLAN, the wireless device increments the virtual carrier sensing occasion counter. The wireless device increments the virtual carrier sensing occasion counter each time the wireless device fails to access the radio resources due to them being busy with traffic/transmissions originating outside the WLAN.

As described above, the wireless device may start the virtual carrier sensing timer having a length based on the information that the AP previously has transmitted to the wireless device as described above.

In an example, the method further comprises, when the maximum number of trials to access the radio resources has been reached, attempting to access the radio resources again by determining 241 whether the radio resources are free or busy.

If the wireless device has failed to access the radio resources many times based on the virtual carrier sensing occasion counter, the wireless device may not again set the virtual carrier sensing timer and refraining from attempting to access the radio resources until it expires.

Instead, the wireless device may monitor the radio resources continuously or with relatively short time intervals, thereby determining whether the radio resources are free or busy. When the wireless device finds the radio resources free, the wireless device may transmit data to the AP.

Figure 2D:
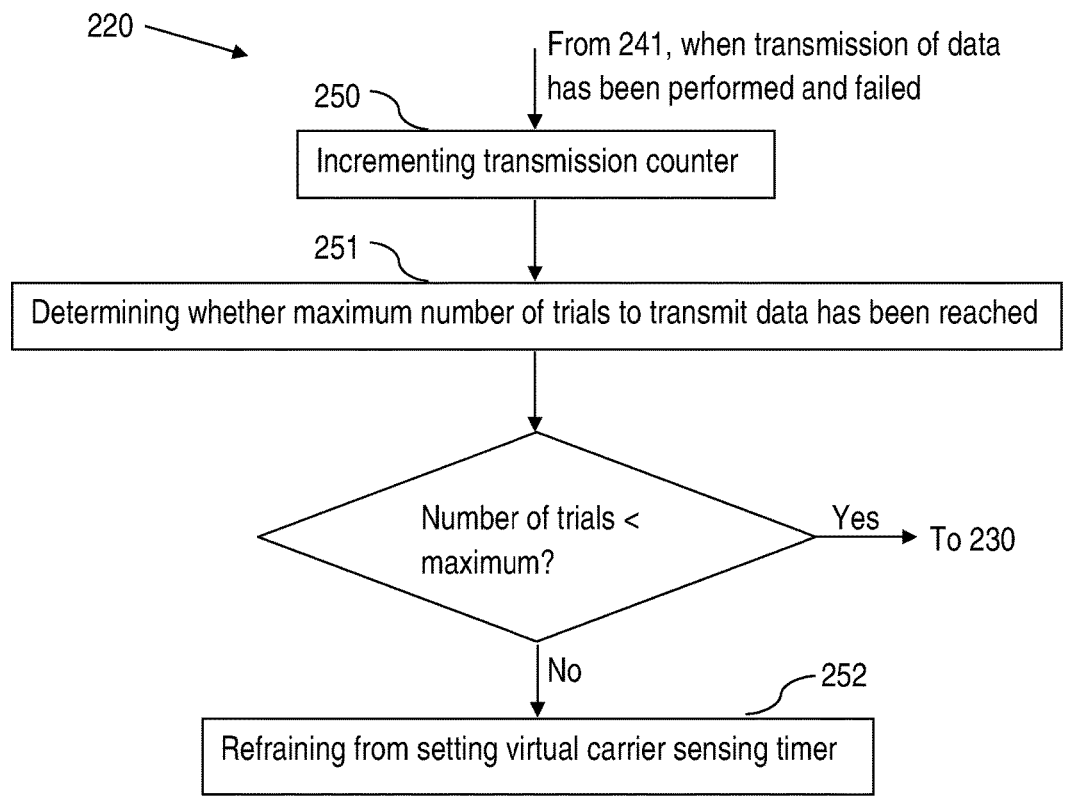
FIG. 2d is a flowchart of a method performed by a wireless device for communicating with an AP according to another exemplifying embodiment.

In an example illustrated in FIG. 2d, the method further comprises, after a transmission of data to the AP has been performed and failed, incrementing 250 a transmission counter, determining 251 whether the maximum number of trials to transmit the data has been reached, and when so: refraining 252 from setting the virtual carrier sensing timer.

The wireless device may be successful or failing to transmit the data to the AP. Even though the wireless device has transmitted the data to the AP, the transmission may fail and the AP may receive nothing or may receive the data being corrupted e.g. due to interference so that the AP cannot successfully decode the data.

If this happens, the wireless device increments the transmission counter and then compares it to a threshold value representing the maximum number of trials allowed. If the maximum number of trials has been done, then the connection (e.g. radio coverage) between the wireless device and the AP is too bad to be able to carry successful traffic between the wireless device and the AP possibly due to interference from other radio system(s). The wireless devices does not set the virtual carrier sensing timer as the failure may be due to several interfering systems and the wireless device may not have information about transmission patterns to base the setting of the virtual carrier sensing timer on. Consequently, the wireless device refrains from setting the virtual carrier sensing timer and instead the wireless device monitors and senses the channel and attempts to access the channel in order to perform a re-transmission.

The described solution above is applicable to various systems, e.g. IEEE 802.11 systems and its 802.11ah amendment and also other technologies (like ZigBee based on IEEE 802.15.4) having a coordinator (AP) and using contention based access e.g. Channel Sensing Multiple Access with Collision Avoidance, CSMA/CA. As briefly described above, the wireless device may receive transmissions, e.g. in the form of packets, and fail to decode them. In other words, signal detection based channel access did not manage to decode the detected traffic. If signal detection channel access fails, then the wireless device may use energy detection in order to determine whether the channel/radio resources is/are free or busy. The solution may for example be used in networks including sensor devices such as 802.11ah sensor wireless devices.

The AP, which may also be referred to as a Basic Service Set, BSS, coordinator, obtains information about a transmission pattern originated from an interfering radio system to its BSS either explicitly via inter system communication or via radio measurements and estimation procedures. This interfering radio system may be of any type for example WLAN, LTE LAA, Bluetooth, 802.15.4, etc. There are many different ways of obtaining information regarding transmission patterns of the interfering radio system.

Explicit information may be obtained via communication between the different radio system coordinators, for example WLAN AP to WLAN AP, or LTE eNB to WLAN AP, or other radio technology to WLAN AP. In the exemplifying case of having LTE LAA to WLAN coexistence, the LTE eNodeB may inform the WLAN AP about the likely durations (for example mean burst duration and its standard deviation) of LTE transmissions on the BSS frequency and what percentage of the air time LTE LAA will use the wireless channel, i.e. the radio resources.

In case there is no communication among co-existing radio systems, radio measurements and estimation procedures may be done to obtain the typical duration of an interfering transmission and its variability. For example, the AP may estimate the mean interference burst duration and standard deviation of this duration. An example of such estimation has been explained above.

The WLAN system may combine the two above points, by verifying the information obtained from the co-existing system with measurement and estimation processes.

If the standard deviation of the packet length is less than a threshold, the WLAN AP signals to its BSS that some other radio system may interfere/co-exist in the same channel. This threshold should be set to a sensible value, for example half of the estimated length, or some other value which is reasonable for achieving energy performance of wireless devices. The signalling information may comprise an estimate of the time duration of interfering transmission(s) and a standard deviation of the packet length. The AP may also notify the wireless devices whether they may use this information for choosing the length of the doze period.

The wireless devices utilise the signalled information. When the wireless devices detect that the channel is busy and they cannot use signal detection to set their virtual carrier sensing timer, e.g. a NAV/RID timer, the wireless devices may set the virtual carrier sensing timer as a function of the signalled duration of interfering transmissions. The wireless devices may also doze/sleep during the virtual carrier-sensing time. When the timer expires, the wireless devices may attempt to access the medium using normal CCA rules. Thus wireless devices may switch to NAV/RID/doze mode (i.e. switch to sleeping mode) in presence of un-decodable interference and save power. For example, a wireless device switches from sleep/doze mode to active mode in the middle of a transmission thus detecting the channel busy immediately, but it cannot differentiate between a WLAN signal and non-WLAN signal because the beginning of the transmission was missed. Then, it is beneficial for the wireless device wait until the channel is idle.

If wireless devices keep sensing the channel being busy after the expiration of their NAV/RID/doze period (i.e. the period of time when the wireless device may be in sleep mode), or if the wireless devices transmission end in failure for a number of times defined by a threshold, the wireless devices may fall back to normal CCA rules also in presence of un-decodable interference and defer from switching to virtual carrier-sensing/sleep mode (e.g. by refraining from setting the virtual carrier sensing timer). The number of tries for current channel access may for example be chosen to 1, but it may be configured, e.g. by an operator, depending on a particular realisation. For example, in the case the interference burst duration is long it makes sense for wireless devices to have a larger number of tries if the payload data is not delay sensitive.

A WLAN AP and other radio system co-existing in the same WLAN BSS frequency band may establish a communication to share basic information in a reasonable time scale. In this communication the co-existing radio system to WLAN BSS may share its transmission time statistics such as the typical duration of its transmissions and the duty cycle of the system; in other words, the percentage of time the co-existing radio system is transmitting over the channel.

An example of this can be, LTE eNB performing LTE LAA operations which it is able to communicate to a WLAN AP. In information exchange, the LTE system can inform, for example, about the following:

time duration of an typical LTE burst, e.g. 10 LTE subframes=10 ms, and its standard deviation, and/or the percentage of type LTE LAA is active e.g. 4/10 percent of the time LTE will be active.

The information exchange between the two or more systems can happen through internet, a cloud service, a core network element, other wired medium or over the air signalling e.g. frame exchanges.

The radio system may be suitable for using this feature when the co-existing interfering transmissions have similar transmission duration. In these circumstances, the AP may calculate an estimate the mean transmission duration and estimate of the transmission duration standard deviation. Thus, AP may learn if the network is suitable to use the proposed solution. In an example, the AP perform these measurements since it is not as power critical as the sensor wireless devices.

For statistical purposes, the AP may observe the network for a predefined time window ($T_{obs}$). During $T_{obs}$, the AP may detect transmission over the air and checks their durations. Then, the AP may determine an estimate of the transmission duration for example by taking a mean value and calculates an estimate of the transmission duration variability for example by taking a standard deviation during $T_{obs}$ as follows:

a) Mean Transmission Duration, MTD. This may simply be derived as the expected packet length:

$$\text{MTD} = E\{\text{Transmission Durations}\} \quad (1)$$

where $E\{\ \}$ is the expectation over all detected transmission durations. Alternatively, AP can calculate the median of the observed transmission durations or other statistical measure b) Transmission duration Deviation, TdD, which defined by the following formula:

$$\text{TdD} = \sqrt{(E\{\text{TransmissionDuration}-\text{MTD}\})^2} \quad (2)$$

where again $E\{\ \}$ is the expectation. If the TdD is small enough, the AP decides that the proposed scheme can be used by the STAs in the network.

In case communication between co-existing radio systems is possible, the AP may enable the possibility in the BSS (i.e. all wireless device in the BSS) to activate the virtual carrier-sensing mechanism without signal detection and possibly doze (switching to sleep mode) during virtual-carrier sensing. Typically, the AP may enable this possibility if the variability (e.g. TdD) is smaller than a predefined threshold.

Figure 3A:
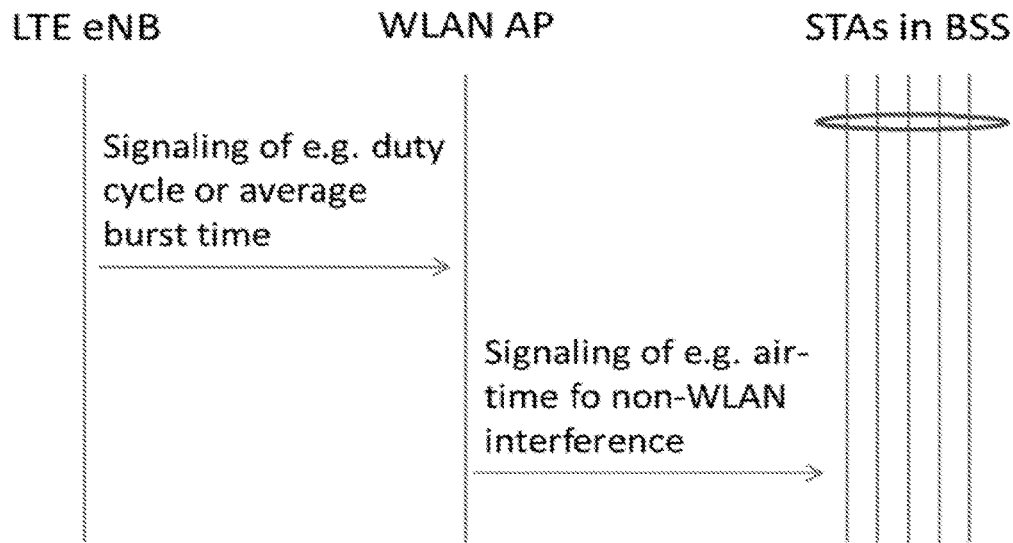
FIG. 3a is an illustration of how a non-WLAN system may inform a WLAN system about its transmission pattern or probable transmission times.

The AP may inform the wireless devices through beacon frames, or other means, that NAV/RID/doze without signal detection is possible and also the AP may signal the time duration setting NAV/RID/doze timers as described above. For example, FIG. 3a shows how this procedure works. The signalling may be standardised by for example IEEE or vendor specific signalling may be used such as in Wi-Fi Alliance, WFA.

Figure 3B:
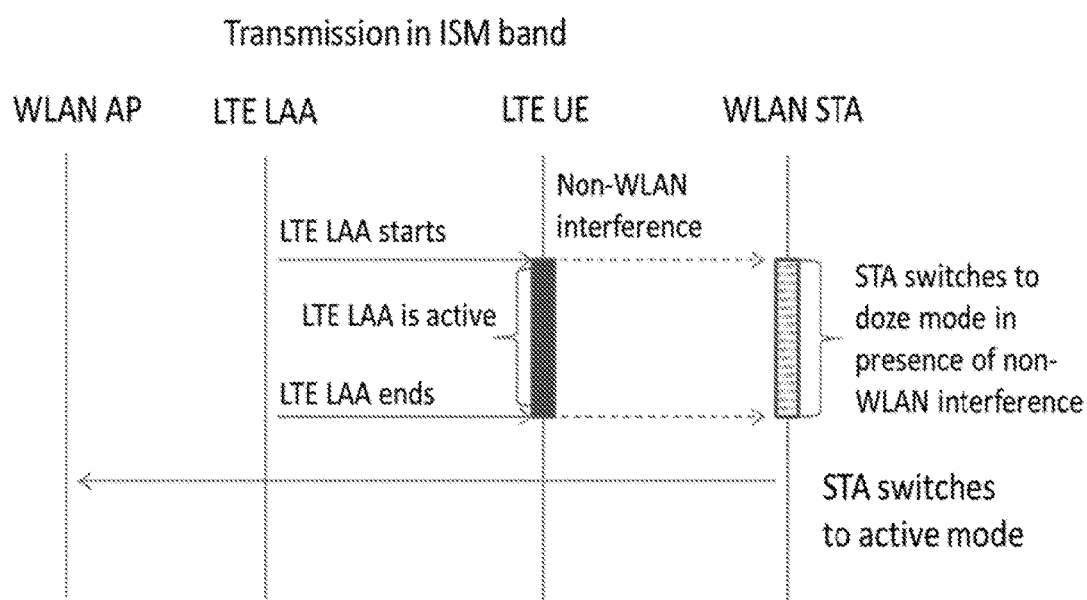
FIG. 3b is an illustration of how WLAN wireless devices may switch to sleep mode in presence of non-WLAN interference and then resume operations in active mode.

At this point, the wireless devices have received all enabling information from the AP. As depicted in FIG. 3b, wireless devices perform CCA to access the medium but the medium is busy. It is assumed that the wireless devices cannot detect a WLAN signal via packet detection (signal detection) thus the interference originates from a non-WLAN source. Thus, wireless devices set their virtual carrier sensing timer (e.g. a NAV/RID/doze timer), or other sleeping counter, by using the information signalled by the AP as described above.

After a wireless device sets its virtual carrier sensing timer (e.g. its NAV/RID/doze timer or other sleeping counter) and the timer expires, the wireless device may sense the channel busy again and set its virtual carrier sensing timer again. Also, the wireless device might sense the channel idle (for example due to false alarm detection) and transmit but not receive acknowledgement form the AP. The wireless device may have a counter to count these described events (sensing busy channel after expiration of the virtual carrier sensing timer or unsuccessful transmissions after the expiration of the virtual carrier sensing timer) and have a threshold based on this counter. After the threshold is surpassed, wireless devices shall use CCA procedure continuously to access the wireless channel, i.e. radio resources. The size of this threshold value may be for example 1, but may be tuned depending on particular scenario or configured by an operator.

If a wireless device is expecting some type of management frames for example beacon frames transmitted at predefined Target Beacons Transmission Times, TBTT, then the wireless device might suspend its option to set its virtual carrier sensing timer with energy detection.

Figure 3C:
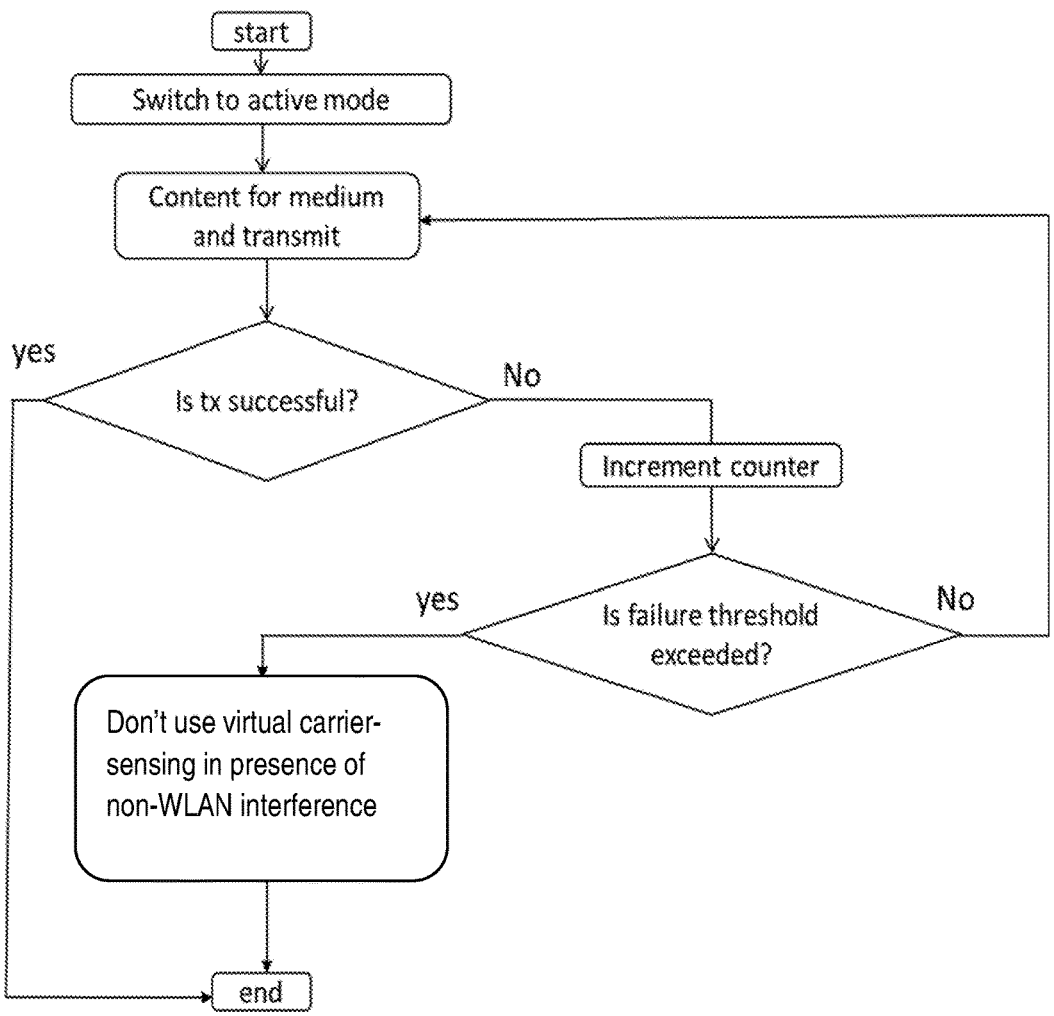
FIG. 3c is a flowchart schematically illustrating how a wireless device may decide to be more aggressive for medium contention if it doesn't switch to Virtual carrier-sensing mode in presence of non-WLAN interference after consecutive unsuccessful transmission attempts.

FIG. 3c is a flowchart schematically illustrating an example of a method performed by a wireless device communicating with an AP, the wireless device and the AP being operable in a WLAN. The flowchart illustrates how a wireless device may decide to be more aggressive for medium contention if it doesn't switch to Virtual carrier-sensing mode in presence of non-WLAN interference after consecutive unsuccessful transmission attempts. FIG. 3c illustrates the method comprising first switching to active mode, assuming the wireless device is in an idle or sleep mode when the method starts. The wireless devices attempts to access radio resources in order to e.g. send data to the AP. The wireless device may sense the channel (e.g. radio resources of the channel) determine that the channel is free and then perform a transmission to the AP granted the channel was determined to be free. The transmission may be successful or not, meaning that the AP received or failed to receive the transmission from the wireless device. If the transmission was successful, then the method is done. However, if the transmission failed, i.e. the AP didn't receive the transmission from the wireless device properly, the wireless device increments a transmission counter indicating the number of attempted transmissions that the wireless device has performed for the data the wireless device is trying to transmit to the AP. In case the wireless device has reached the maximum number of allowed attempts, i.e. in case the failure threshold is exceeded, then the wireless device refrains from dozing in presence of non-WLAN interference. However, if the wireless device has not reached the maximum number of allowed transmission attempts, the wireless device may anew attempt to access radio resources in order to re-transmit the data to the AP.

Embodiments herein also relate to an AP operable in a WLAN for communicating with a wireless device, the WLAN employing contention based access for radio resources. The AP has the same objects, technical features and advantages as the method performed by the AP as described above. The AP will only be described in brief in order to avoid unnecessary repetition. The AP will be described with reference to FIGS. 4 and 5.

Figure 4:
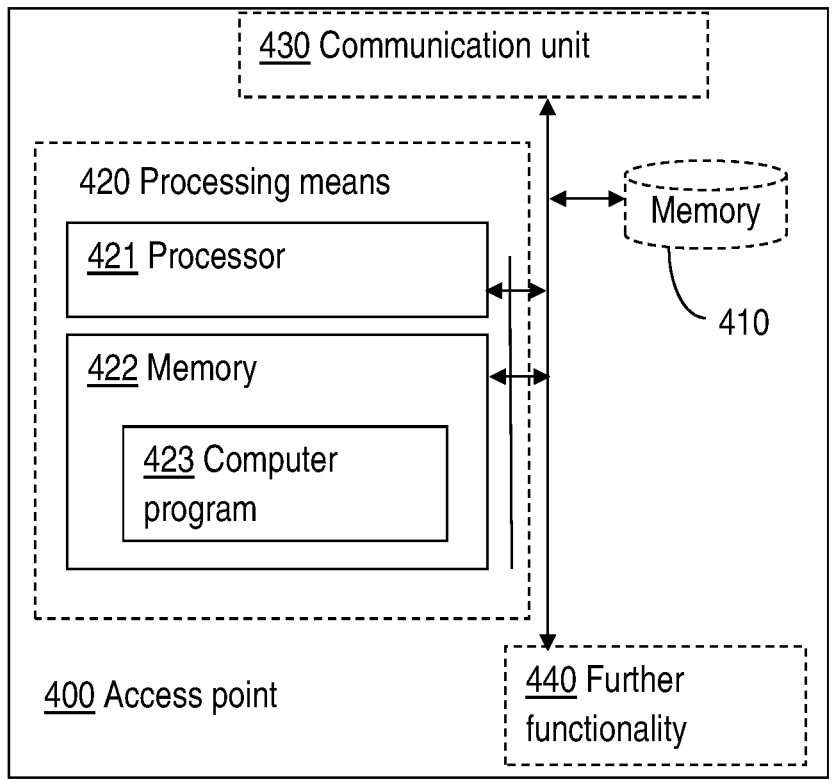
FIG. 4 is a block diagram of an AP for communicating with a wireless device according to an exemplifying embodiment.

FIG. 4 is a block diagram of an AP configured for communicating with a wireless device.

Figure 5:
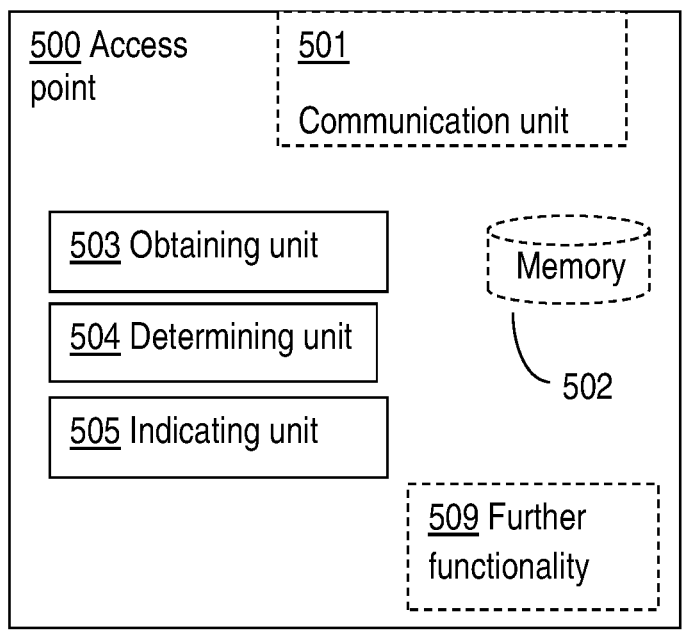
FIG. 5 is a block diagram of an AP for communicating with a wireless device according to yet an exemplifying embodiment.

FIG. 5 is a block diagram of an AP configured for communicating with a wireless device.

FIGS. 4 and 5 illustrate the AP being configured for obtaining information about transmission pattern(s) of interfering radio system(s), and determining a deviation of packet length for transmission(s) of the interfering radio systems(s). The AP is further configured for indicating, to the wireless device the deviation of packet length and the information about transmission pattern(s) of interfering radio system(s) when the deviation is less than a deviation threshold.

The AP may be realised on implemented in various ways. A first exemplifying realisation or implementation is illustrated in FIG. 4. FIG. 4 illustrates the AP comprising a processor 421 and memory 422, the memory comprising instructions, e.g. by means of a computer program 423, which when executed by the processor 421 causes the AP 400 to obtain information about transmission pattern(s) of interfering radio system(s), and to determine a deviation of packet length for transmission(s) of the interfering radio systems(s). The memory further comprises instructions, which when executed by the processor 421 causes the AP 400 to indicate, to the wireless device, the deviation of packet length and the information about transmission pattern(s) of interfering radio system(s) when the deviation is less than a deviation threshold.

FIG. 4 also illustrates the AP 400 comprising a memory 410. It shall be pointed out that FIG. 4 is merely an exemplifying illustration and memory 410 may be optional, be a part of the memory 422 or be a further memory of the AP 400. The memory may for example comprise information relating to the AP 400, to statistics of operation of the AP 400, just to give a couple of illustrating examples. FIG. 4 further illustrates the AP 400 comprising processing means 420, which comprises the memory 422 and the processor 421. Still further, FIG. 4 illustrates the AP 400 comprising a communication unit 430. The communication unit 430 may comprise an interface through which the AP 400 communicates with other nodes or entities of the WLAN as well as other communication units. FIG. 4 also illustrates the AP 400 comprising further functionality 440. The further functionality 440 may comprise hardware of software necessary for the AP 400 to perform different tasks that are not disclosed herein.

An alternative exemplifying realisation, or implementation, of the AP is illustrated in FIG. 5. FIG. 5 illustrates the AP 500 comprising an obtaining unit 503 for obtaining information about transmission pattern(s) of interfering radio system(s). FIG. 5 also illustrates the AP 500 comprising a determining unit 504 for determining a deviation of packet length for transmission(s) of the interfering radio systems(s). Still further, FIG. 5 illustrates the AP 500 comprising an indicating unit 505 for indicating, to the wireless device, the deviation of packet length and the information about transmission pattern(s) of interfering radio system(s) when the deviation is less than a deviation threshold.

In FIG. 5, the AP 500 is also illustrated comprising a communication unit 501. Through this unit, the AP 500 is adapted to communicate with other nodes and/or entities in the WLAN. The communication unit 501 may comprise more than one receiving arrangement. For example, the communication unit 501 may be connected to both a wire and an antenna, by means of which the AP 500 is enabled to communicate with other nodes and/or entities in the WLAN. Similarly, the communication unit 501 may comprise more than one transmitting arrangement, which in turn is connected to both a wire and an antenna, by means of which the AP 500 is enabled to communicate with other nodes and/or entities in the WLAN. The AP 500 further comprises a memory 502 for storing data. Further, the AP 500 may comprise a control or processing unit (not shown) which in turn is connected to the different units 503-505. It shall be pointed out that this is merely an illustrative example and the AP 500 may comprise more, less or other units or modules which execute the functions of the AP 500 in the same manner as the units illustrated in FIG. 5.

It should be noted that FIG. 5 merely illustrates various functional units in the AP 500 in a logical sense. The functions in practice may be implemented using any suitable software and hardware means/circuits etc. Thus, the embodiments are generally not limited to the shown structures of the AP 500 and the functional units. Hence, the previously described exemplary embodiments may be realised in many ways. For example, one embodiment includes a computer-readable medium having instructions stored thereon that are executable by the control or processing unit for executing the method steps in the AP 500. The instructions executable by the computing system and stored on the computer-readable medium perform the method steps of the AP 500 as set forth in the claims.

The AP has the same possible advantages as the method performed by the AP. One possible advantage is that when signal detection is not possible at the wireless device, but energy detection detects traffic on the channel, the wireless device is allowed to activate virtual carrier-sensing and possibly doze for a known time, or fixed time. By transmitting the above described information to the wireless device, the wireless device is informed if it is allowed to activate virtual carrier-sensing and may determine how long to activate virtual carrier-sensing based on the transmitted information. Utilising this knowledge, during non-decodable interference, by activating virtual carrier-sensing and possibly sleeping instead of constantly monitoring the channel the wireless device will save battery.

According to an embodiment, The AP is further configured for obtaining information about time duration of transmission(s) of the interfering radio systems(s), and indicating, the time duration of transmission(s) of the interfering radio systems(s).

According to another embodiment, the AP is configured for obtaining the information about time duration of transmission(s) by (i) estimating the time duration based on the transmission pattern(s) of interfering radio system(s), and/or (ii) receiving information about the time duration from the interfering radio system(s) using inter-system communication.

According to yet another embodiment, the AP is configured for obtaining of information about transmission pattern(s) by receiving information from the interfering radio system(s).

According to still another embodiment, the AP is configured for obtaining of information about transmission pattern(s) by performing measurements of interfering transmission(s) from the interfering radio system(s).

According to a further embodiment, the information signalled to the wireless device comprises information indicating whether the wireless device may use the information for choosing length of virtual carrier-sensing time and/or choosing length of a sleep mode period.

Embodiments herein also herein also relate to a wireless device operable in a WLAN for communicating with an AP, the WLAN employing contention based access for radio resources. The wireless device has the same objects, technical features and advantages as the method performed by the wireless device as described above. The wireless device will only be described in brief in order to avoid unnecessary repetition. The wireless device will be described with reference to FIGS. 6 and 7.

Figure 6:
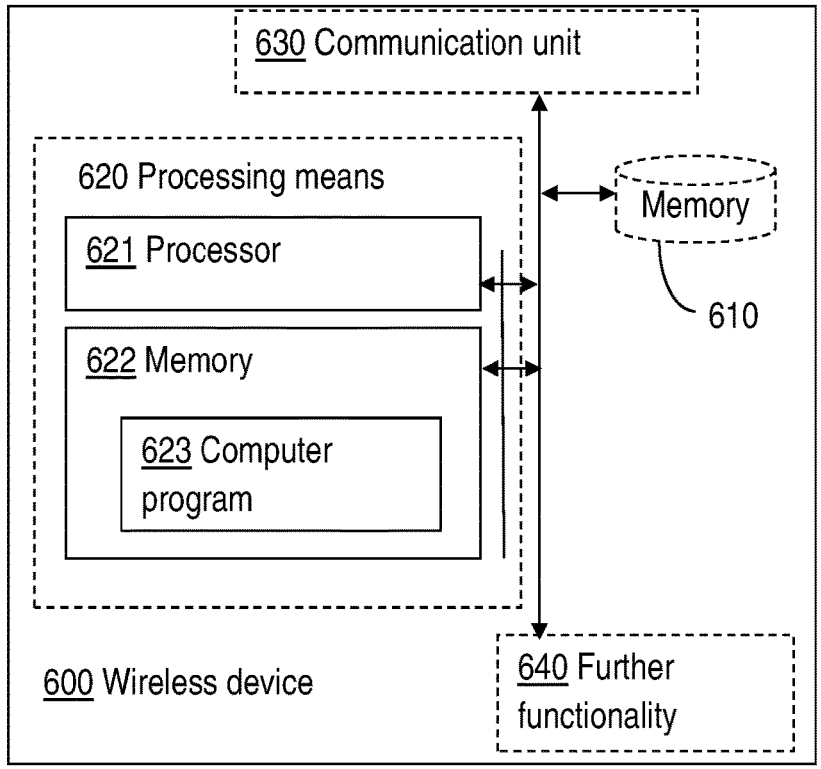
FIG. 6 is a block diagram of a wireless device for communicating with an AP according to an exemplifying embodiment.

FIG. 6 is a block diagram of a wireless device configured for communicating with an AP.

Figure 7:
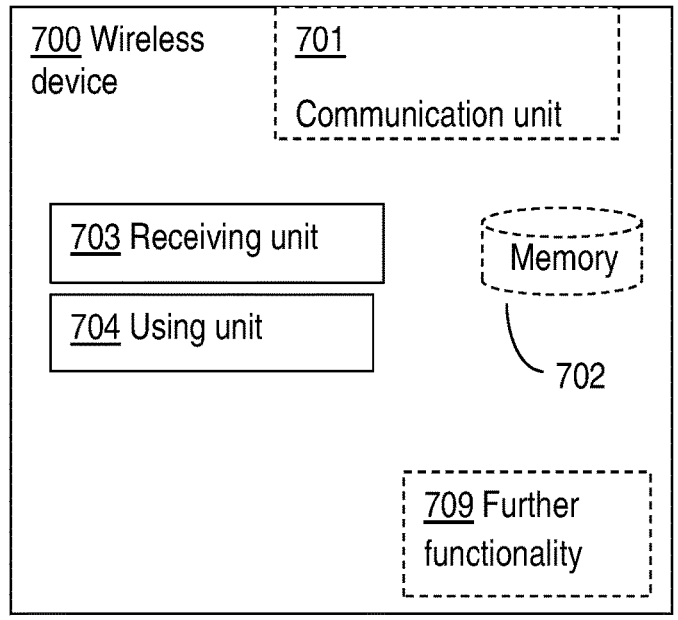
FIG. 7 is a block diagram of a wireless device for communicating with an AP according to another exemplifying embodiment.

FIG. 7 is a block diagram of a wireless device configured for communicating with an AP.

FIGS. 6 and 7 illustrate the wireless device being configured for receiving, from the AP, information indicating a deviation of packet length and information about transmission pattern(s) of interfering radio system(s); and using the received information for communication with the AP.

The wireless device may be realised on implemented in various ways. A first exemplifying realisation or implementation is illustrated in FIG. 6. FIG. 6 illustrates the wireless device comprising a processor 621 and memory 622, the memory comprising instructions, e.g. by means of a computer program 623, which when executed by the processor 621 causes the wireless device 600 to receive, from the AP, information indicating a deviation of packet length and information about transmission pattern(s) of interfering radio system(s); and to use the received information for communication with the AP.

FIG. 6 also illustrates the wireless device 6 comprising a memory 610. It shall be pointed out that FIG. 6 is merely an exemplifying illustration and memory 610 may be optional, be a part of the memory 622 or be a further memory of the wireless device 600. The memory may for example comprise information relating to the wireless device 6, to statistics of operation of the wireless device 600, just to give a couple of illustrating examples. FIG. 6 further illustrates the wireless device 600 comprising processing means 620, which comprises the memory 622 and the processor 621. Still further, FIG. 6 illustrates the wireless device 600 comprising a communication unit 630. The communication unit 630 may comprise an interface through which the wireless device 600 communicates with other nodes or entities of the WLAN as well as other communication units. FIG. 6 also illustrates the wireless device 600 comprising further functionality 640. The further functionality 640 may comprise hardware of software necessary for the wireless device 600 to perform different tasks that are not disclosed herein.

An alternative exemplifying realisation, or implementation, of the wireless device is illustrated in FIG. 7. FIG. 7 illustrates the wireless device 700 comprising a receiving unit 703 for receiving, from the AP, information indicating a deviation of packet length and information about transmission pattern(s) of interfering radio system(s); and a using unit 704 for using the received information for communication with the AP.

In FIG. 7, the wireless device 700 is also illustrated comprising a communication unit 701. Through this unit, wireless device 700 is adapted to communicate with other nodes and/or entities in the WLAN. The communication unit 701 may comprise more than one receiving arrangement. For example, the communication unit 701 may be connected to both a wire and an antenna, by means of which the wireless device 700 is enabled to communicate with other nodes and/or entities in the WLAN. Similarly, the communication unit 701 may comprise more than one transmitting arrangement, which in turn is connected to both a wire and an antenna, by means of which the wireless device 700 is enabled to communicate with other nodes and/or entities in the WLAN. The wireless device 700 further comprises a memory 702 for storing data. Further, the wireless device 700 may comprise a control or processing unit (not shown) which in turn is connected to the different units 703-704. It shall be pointed out that this is merely an illustrative example and the wireless device 700 may comprise more, less or other units or modules which execute the functions of the wireless device 700 in the same manner as the units illustrated in FIG. 7.

It should be noted that FIG. 7 merely illustrates various functional units in the wireless device 700 in a logical sense. The functions in practice may be implemented using any suitable software and hardware means/circuits etc. Thus, the embodiments are generally not limited to the shown structures of the wireless device 700 and the functional units. Hence, the previously described exemplary embodiments may be realised in many ways. For example, one embodiment includes a computer-readable medium having instructions stored thereon that are executable by the control or processing unit for executing the method steps in the wireless device 700. The instructions executable by the computing system and stored on the computer-readable medium perform the method steps of the wireless device 700 as set forth in the claims.

The wireless device has the same possible advantages as the method performed by the wireless device. One possible advantage is that when signal detection is not possible at the wireless device, but energy detection detects traffic on the channel, the wireless device is allowed to activate virtual carrier-sensing for a known time, or fixed time. By transmitting the above described information to the wireless device, the wireless device is informed if it is allowed to activate virtual carrier-sensing and may determine how long to activate virtual carrier-sensing based on the transmitted information. Utilising this knowledge, during non-decodable interference, by activating virtual carrier-sensing and possibly sleeping instead of constantly monitoring the channel the wireless device will save battery.

According to an embodiment, the wireless device is further being configured for receiving information indicating an estimated time duration of transmission(s) of interfering radio systems(s), wherein the using of the received information also comprises using the received information about the estimated time duration of transmission(s) of interfering radio systems(s) for communication with the AP.

According to yet an embodiment, the wireless device is further being configured for using of the received information by, when packet detection fails, setting a virtual carrier sensing timer having a duration which is based on the received information, and starting a virtual carrier sensing occasion counter.

According to still an embodiment, the wireless device is further being configured for switching to sleep mode after the virtual carrier sensing timer is set.

According to another embodiment, the wireless device is further being configured for using of the received information further by, when the virtual carrier sensing timer expires: switching to active mode if being in sleep mode; and determining whether the radio resources are free or busy. The wireless device is further being configured for; when the radio resources are busy and when decoding of detected traffic fails, determining if the maximum number of trials to access the radio resources has been reached based on the virtual carrier sensing occasion counter; and when the maximum number of trials to access the radio resources has been reached: refraining from setting the virtual carrier sensing timer.

According to yet an embodiment, the wireless device is further being configured for when the maximum number of trials to access the radio resources has not been reached:

starting the virtual carrier sensing timer; and incrementing a virtual carrier sensing occasion counter.

According to still an embodiment, the wireless device is further being configured for, when the maximum number of trials to access the radio resources has been reached, attempting to access the radio resources again by determining whether the radio resources are free or busy.

According to another embodiment, the wireless device is further being configured for, after a transmission of data to the AP has been performed and failed, incrementing a transmission counter, determining whether the maximum number of trials to transmit the data has been reached, and when so: refraining from setting the virtual carrier sensing timer.

Figure 8:
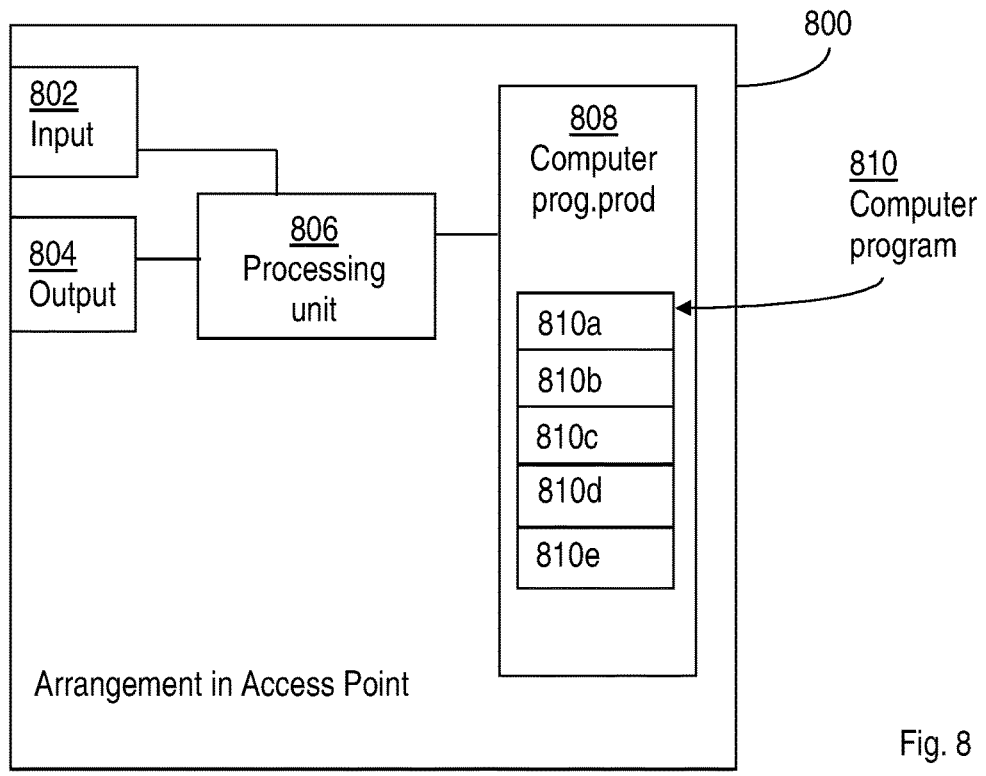
FIG. 8 is a block diagram of an arrangement in an AP for communicating with a wireless device according to yet an exemplifying embodiment.

FIG. 8 schematically shows an embodiment of an arrangement 800 in an AP 500. Comprised in the arrangement 800 in the AP 500 are here a processing unit 806, e.g. with a Digital Signal Processor, DSP. The processing unit 806 may be a single unit or a plurality of units to perform different actions of procedures described herein. The arrangement 800 of the AP 500 may also comprise an input unit 802 for receiving signals from other entities, and an output unit 804 for providing signal(s) to other entities. The input unit and the output unit may be arranged as an integrated entity or as illustrated in the example of FIG. 5, as one or more interfaces 501.

Furthermore, the arrangement in the AP 500 comprises at least one computer program product 808 in the form of a non-volatile memory, e.g. an Electrically Erasable Programmable Read-Only Memory, EEPROM, a flash memory and a hard drive. The computer program product 808 comprises a computer program 810, which comprises code means, which when executed in the processing unit 806 in the arrangement 800 in the AP 500 causes the AP to perform the actions e.g. of the procedure described earlier in conjunction with FIGS. 1a-1c.

The computer program 810 may be configured as a computer program code structured in computer program modules 810a-810e. Hence, in an exemplifying embodiment, the code means in the computer program of the arrangement 800 in the AP comprises an obtaining unit, or module, for obtaining information about transmission pattern(s) of interfering radio system(s); and a determining unit, or module, for determining a deviation of packet length for transmission(s) of the interfering radio systems(s). Further, the computer program of the arrangement 800 in the AP comprises and indicating unit, or module, for indicating, to the wireless device the deviation of packet length and the information about transmission pattern(s) of interfering radio system(s) when the deviation is less than a deviation threshold.

The computer program modules could essentially perform the actions of the flow illustrated in FIG. 1, to emulate the AP 500. In other words, when the different computer program modules are executed in the processing unit 806, they may correspond to the unit 505 of FIG. 5.

Figure 9:
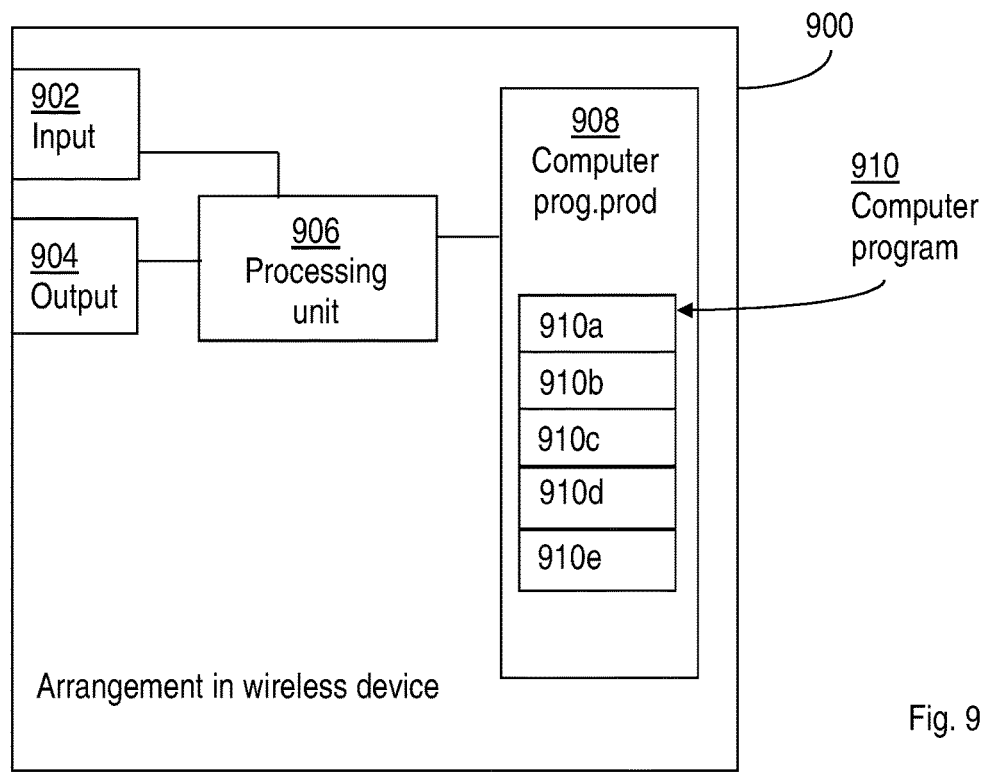
FIG. 9 is a block diagram of an arrangement in a wireless device for communicating with an AP according to another exemplifying embodiment.

FIG. 9 schematically shows an embodiment of a wireless device 900. Comprised in the wireless device 900 are here a processing unit 906, e.g. with a Digital Signal Processor. The processing unit 906 may be a single unit or a plurality of units to perform different actions of procedures described herein. The wireless device 900 may also comprise an input unit 902 for receiving signals from other entities, and an output unit 904 for providing signal(s) to other entities. The input unit and the output unit may be arranged as an integrated entity or as illustrated in the example of FIG. 7, as one or more interfaces 701.

Furthermore, the wireless device 900 comprises at least one computer program product 908 in the form of a non-volatile memory, e.g. an Electrically Erasable Programmable Read-Only Memory, EEPROM, a flash memory and a hard drive. The computer program product 908 comprises a computer program 910, which comprises code means, which when executed in the processing unit 906 in the arrangement 900 in the wireless device causes the wireless device to perform the actions e.g. of the procedure described earlier in conjunction with FIGS. 2a-2d.

The computer program 910 may be configured as a computer program code structured in computer program modules 910a-910e. Hence, in an exemplifying embodiment, the code means in the computer program of the arrangement 900 in the wireless device comprises a receiving unit, or module, for receiving, from the AP, information indicating a deviation of packet length and information about transmission pattern(s) of interfering radio system(s). The code means in the computer program of the arrangement 900 in the wireless device further comprises a using unit, or module, for using the received information for communication with the AP.

The computer program modules could essentially perform the actions of the flow illustrated in FIGS. 2a-2d, to emulate the wireless device 700. In other words, when the different computer program modules are executed in the processing unit 906, they may correspond to the units 703-704 of FIG. 7.

Although the code means in the respective embodiments disclosed above in conjunction with FIGS. 5 and 7 are implemented as computer program modules which when executed in the respective processing unit causes the AP and the wireless device respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the AP and the wireless device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by an Access Point (AP) operable in a Wireless Local Area Network (WLAN) for communicating with a wireless device, the WLAN employing contention based access for radio resources, the method comprising:
obtaining information about a transmission pattern of an interfering radio system;
determining a deviation of packet length for transmissions of the interfering radio system; and,
in response to determining that the deviation is less than a deviation threshold, indicating, to the wireless device, the deviation of packet length and the information about the transmission pattern of the interfering radio system.

2. The method of claim 1, further comprising obtaining information about time duration of transmissions of the interfering radio system, and indicating the time duration of transmissions of the interfering radio system when indicating, to the wireless device, the deviation of packet length and the information about the transmission pattern of the interfering radio system.

3. The method of claim 2, wherein the obtaining the information about time duration of transmissions comprises (i) estimating the time duration based on the transmission pattern of the interfering radio system, and/or (ii) receiving information about the time duration from the interfering radio system using inter-system communication.

4. A method performed by a wireless device in a Wireless Local Area Network (WLAN) for communicating with an Access Point (AP), the WLAN employing contention-based access for radio resources, the method comprising:
receiving, from the AP, information indicating a deviation of packet length and information about a transmission pattern of an interfering radio system; and
using the received information for communication with the AP.

5. The method of claim 4, further comprising receiving information indicating an estimated time duration of transmissions of the interfering radio system, wherein the using of the received information also comprises using the received information about the estimated time duration of transmissions of the interfering radio system for communication with the AP.

6. The method of claim 4, wherein the using of the received information comprises, when packet detection fails:
setting a virtual carrier sensing timer having a duration which is based on the received information, and
starting a virtual carrier sensing occasion counter.

7. An Access Point (AP) operable in a Wireless Local Area Network (WLAN) for communicating with a wireless device, the WLAN employing contention-based access for radio resources, the AP comprising:
a processing circuit; and
a memory operatively coupled to the processing circuit and storing program instructions for execution by the processing circuit, whereby the AP is configured to:
obtain information about a transmission pattern of an interfering radio system;
determine a deviation of packet length for transmission of the interfering radio system; and
in response to determining that the deviation is less than a deviation threshold, indicating, to the wireless device, the deviation of packet length and the information about the transmission pattern of the interfering radio system.

8. The AP of claim 7, further being configured to obtain information about time duration of transmissions of the interfering radio systems, and to indicate, to the wireless device, the time duration of transmissions of the interfering radio system.

9. The AP of claim 8, wherein the AP is configured to obtain the information about time duration of transmissions by (i) estimating the time duration based on the transmission pattern of the interfering radio system, and/or (ii) receiving information about the time duration from the interfering radio system using inter-system communication.

10. The AP of claim 7, wherein the AP is configured to obtain the information about the transmission pattern by receiving the information from the interfering radio system.

11. The AP of claim 7, wherein the AP is configured to obtain the information about the transmission pattern by performing measurements of interfering transmissions from the interfering radio system.

12. The AP of claim 7, wherein the information signaled to the wireless device comprises information indicating whether the wireless device may use the information for choosing length of virtual carrier-sensing time and/or choosing length of a sleep mode period.

13. A wireless device operable in a Wireless Local Area Network (WLAN) for communicating with an Access Point (AP) the WLAN employing contention based access for radio resources, the wireless device comprising:
a processing circuit; and
a memory operatively coupled to the processing circuit and storing program instructions for execution by the processing circuit, whereby the wireless device is configured to:
receive, from the AP, information indicating a deviation of packet length and information about a transmission pattern of an interfering radio system, and
use the received information for communication with the AP.

14. The wireless device of claim 13, further being configured for receiving information indicating an estimated time duration of transmission(s) of interfering radio systems(s), wherein the using of the received information also comprises using the received information about the estimated time duration of transmission(s) of interfering radio systems(s) for communication with the AP.

15. The wireless device of claim 13, further being configured to use the received information by, when packet detection fails:
setting a virtual carrier sensing timer having a duration which is based on the received information, and
starting a virtual carrier sensing occasion counter.

16. The wireless device of claim 15, further being configured to switch to sleep mode after the virtual carrier sensing timer is set.

17. The wireless device of claim 15, further being configured to use the received information further by, when the virtual carrier sensing timer expires:
switching to active mode if being in sleep mode,
determining whether the radio resources are free or busy, when the radio resources are busy and when decoding of detected traffic fails:

determining if the maximum number of trials to access the radio resources has been reached based on the virtual carrier sensing occasion counter, and when the maximum number of trials to access the radio resources has been reached, refraining from setting the virtual carrier sensing timer.

18. The wireless device of claim 17, further being configured to, when the maximum number of trials to access the radio resources has not been reached:

start the virtual carrier sensing timer, and increment a virtual carrier sensing occasion counter.

19. The wireless device of claim 17, further being configured to, when the maximum number of trials to access the radio resources has been reached, attempt to access the radio resources again by determining whether the radio resources are free or busy.

20. The wireless device of claim 19, further being configured to, after a transmission of data to the AP has been performed and failed, increment a transmission counter, determine whether the maximum number of trials to transmit the data has been reached, and, when so: refrain from setting the virtual carrier sensing timer.

* * * * *